Sept. 22, 1925.
O. W. MOORE
1,554,644
GAUGE ATTACHING DEVICE
Filed March 15, 1922
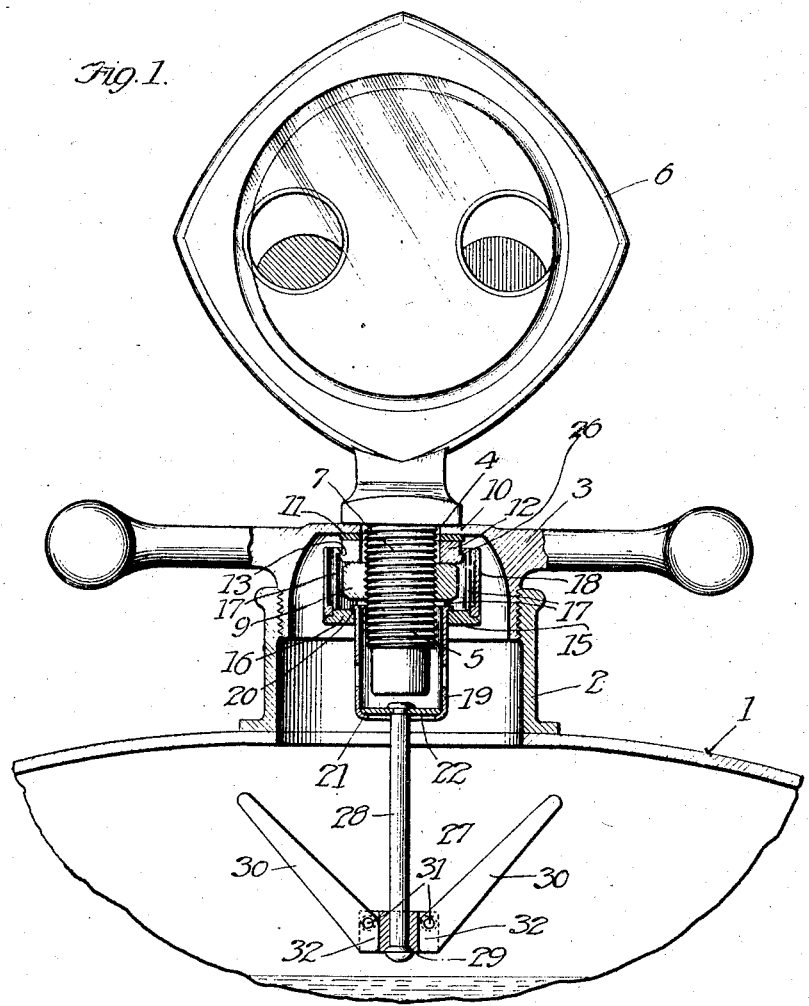
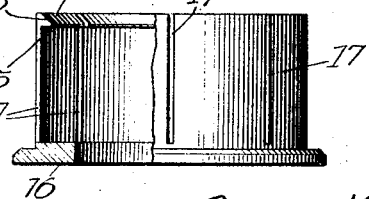

Patented Sept. 22, 1925.

1,554,644

UNITED STATES PATENT OFFICE.

OSCAR W. MOORE, OF CHICAGO, ILLINOIS.

GAUGE-ATTACHING DEVICE.

Application filed March 15, 1922. Serial No. 544,055.

*To all whom it may concern:*

Be it known that I, OSCAR W. MOORE, a citizen of the United States of America, and a resident of Chicago, county of Cook, and State of Illinois, have invented a new and useful Improvement in Gauge-Attaching Devices, of which the following is a specification.

This invention relates to means for permanently attaching a gauge or other instrument to its support. The construction as illustrated is designed specifically for attaching a temperature indicator to the radiator cap of an automobile engine. The objects of the invention are to provide improved means for rendering the clamping nut for securing the temperature indicator to the radiator cap inaccessible, and thereby prevent the removal of the instrument from the cap without destroying the cap. A further object of the invention is to provide improved means for allowing the radiator cap to be removed from the filler spout sufficiently to allow the filling of the radiator, but to prevent the entire detachment of the cap and the instrument carried thereby from the radiator.

The objects of the invention are accomplished by the device shown in the accompanying drawing, wherein—

Figure 1 is a front elevation partly in section illustrating the filler spout of a radiator having a cap on which is supported a temperature indicator, and which is secured to the cap by the improved mechanism.

Fig. 2 is a detail partly in section of one of the elements of the locking mechanism.

Fig. 3 is a detail partly in section of another coacting element of the locking mechanism.

The improved locking mechanism may be applied to any attachment of the class mentioned wherein an instrument such as a temperature gauge has a threaded shank passing through an aperture in a support, and a clamping nut engaging said threaded shank to secure it. The improved structure may comprise a shouldered annular locking element or washer between the nut and cap body, and a cup-shaped coacting element adapted to surround the clamping nut and render it inaccessible, and having interior resilient locking pawls for engaging said shouldered element.

The drawings show a radiator casing 1, provided with a filler spout 2, which has threaded engagement with a closing cap 3. The cap has a central aperture 4, for receiving the shank 5 of a temperature indicator 6. The upper portion of the shank 5 is provided with threads 7 for coacting with a clamping nut 9 by means of which the instrument is securely fastened to a web or body part of the cap 3. Between the clamping nut 9 and web 10 is a washer 11, and a washer-shaped locking element 12. This locking element 12 has an annular shoulder 13 for coacting with pawl-shaped resilient fingers 14 in a hollow cylindrical cup-shaped enclosing member 15. The member 15 comprises a centrally apertured disk-shaped part 16, from which extend upwardly the integral pawl-shaped catches 14. These catches 14 are formed from an annular upstanding flange on the part 16 by the saw cuts 17. The enclosing element 15 also comprises a tubular member 18 surrounding the locking pawls 14, and another depending tubular element 19 which has beaded over edges 20 and 21 respectively engaging the disk-shaped portion 16 and for retaining a disk 22, closing the bottom of the tubular element 19.

The enclosing member 15 which renders the clamping nut inaccessible is applied by pressing it upwardly after the nut has been screwed on to shank 5. When it is forced upwardly the beveled surfaces 23 at the upper ends of the locking pawls, ride outwardly over the beveled surface 24 of the coacting stationary locking element 12. But if it is attempted to remove this enclosing member 15 by pulling downwardly upon the same, this motion is prevented by the coacting flat surfaces 25 of the pawls 14, and the surface 26 of the stationary element 12.

The device is complete as so far described for the purposes of a cap which is hinged to the filler spout, but when the cap has threaded engagement with the spout, the anchoring device 27 is employed. This device permits the cap to be unscrewed from the spout and moved over to one side of it in order to permit of filling the radiator, but prevents the total removement of the cap and instrument carried thereby. The anchor consists of a bar 28 depending from the center of disk 22 and riveted to this disk, and carrying at its lower end a collar 29 which is vertically slotted at its periphery to receive the hinged arms 30. These arms are pivoted to the collar by pins 31 and have shoulders 32, which will permit the arms 30 to swing inwardly against the bar 28 when the cap is initially screwed into the filler spout, but then allow the arms 30 to rock outwardly a limited distance. With the arms 30 in position as illustrated, the cap may be totally removed from the filler spout only with great difficulty, as it is necessary to rock all the arms 30 inwardly and hold them in such position before the cap may be removed.

Although but one specific embodiment of this invention has been herein shown and described it will be understood that numerous details of the construction shown may be altered or omitted without departing from the spirit of this invention as defined by the following claims.

I claim:

1. A device of the class described comprising the combination with an instrument and a support therefor, of a shank for said instrument having a reduced threaded portion extending through an aperture in said support, a clamping nut engaging said threaded portion of the shank to clamp the instrument on the support, a shouldered ring between said nut and support, a cup-shaped element for enclosing said nut and shank, said cup-shaped element being provided with resilient toothed members for engaging said shouldered ring.

2. An enclosing and locking means of the class described comprising an annular member provided with a locking shoulder, and a coacting member consisting of a cylindrical housing carrying in its interior resilient locking pawls for coacting with said annular member.

3. An enclosing and locking means of the class described comprising an annular member provided with a locking shoulder, and a coacting member consisting of a cylindrical housing carrying in its interior resilient locking pawls for coacting with said annular member, said annular member and said pawls having beveled coacting surfaces which permit the pawls to engage said shouldered member upon coaxial relative movement in one direction between said shouldered member and the surrounding housing.

4. A locking device of the class described comprising a shouldered annular member and a coacting member provided with resilient elements for lockingly engaging said shouldered member, a cylindrical surrounding shell, and a washer-shaped base provided with a central depending cup-shaped housing.

Signed at Chicago this 11 day of March 1922.

OSCAR W. MOORE.